US010693192B2

(12) United States Patent
Zeng et al.

(10) Patent No.: US 10,693,192 B2
(45) Date of Patent: Jun. 23, 2020

(54) WOUND-TYPE CELL

(71) Applicant: NINGDE AMPEREX TECHNOLOGY LIMITED, Ningde (CN)

(72) Inventors: Qiao Zeng, Ningde (CN); Jiacai Cai, Ningde (CN); Kefei Wang, Ningde (CN); Yu Luo, Ningde (CN)

(73) Assignee: NINGDE AMPEREX TECHNOLOGY LIMITED, Ningde, Fujian Province (CN)

( * ) Notice: Subject to any disclaimer, the term of this patent is extended or adjusted under 35 U.S.C. 154(b) by 0 days.

(21) Appl. No.: 16/177,087

(22) Filed: Oct. 31, 2018

(65) Prior Publication Data

US 2019/0067746 A1 Feb. 28, 2019

Related U.S. Application Data

(63) Continuation of application No. 15/457,775, filed on Mar. 13, 2017.

(30) Foreign Application Priority Data

Mar. 31, 2016 (CN) .......................... 2016 1 0196793

(51) Int. Cl.
*H01M 10/0587* (2010.01)
*H01M 10/04* (2006.01)
(Continued)

(52) U.S. Cl.
CPC ....... *H01M 10/0587* (2013.01); *H01M 2/263* (2013.01); *H01M 10/0431* (2013.01); *H01M 10/0525* (2013.01)

(58) Field of Classification Search
CPC ........... H01M 10/0409; H01M 10/125; H01M 10/0587
See application file for complete search history.

(56) References Cited

U.S. PATENT DOCUMENTS 4,000,351 A * 12/1976 Hug .................. H01M 6/10
429/94
6,468,692 B1 * 10/2002 Nemoto ................ H01M 2/08
429/171
(Continued)

FOREIGN PATENT DOCUMENTS

CN 201397861 Y 2/2010

OTHER PUBLICATIONS

Ningde Amperex Technology Limited, Extended European Search Report, EP17159512.7, dated Apr. 17, 2017, 7 pgs.
(Continued)

*Primary Examiner* — Robert S Carrico
(74) *Attorney, Agent, or Firm* — Morgan, Lewis & Bockius LLP

(57) ABSTRACT

The present disclosure provides a wound-type cell which includes: a first electrode plate; a second electrode plate; a separator disposed between the first electrode plate and the second electrode plate; a first electrode tab electrically connected to the first electrode plate; and a second electrode tab electrically connected to the second electrode plate; in which a third winding start end of the separator is positioned at an outer side of a second winding start end of the second electrode plate in a length direction; the third winding start end extends along a direction away from a second end of the second winding start end and the third winding start end is not folded back.

12 Claims, 9 Drawing Sheets

(51) Int. Cl.
*H01M 2/26* (2006.01)
*H01M 10/0525* (2010.01)

(56) References Cited

U.S. PATENT DOCUMENTS

| | | | | |
|---|---|---|---|---|
| 2003/0099880 | A1* | 5/2003 | Park | H01M 2/26 |
| | | | | 429/211 |
| 2004/0161662 | A1 | 8/2004 | Kim | |
| 2009/0297929 | A1 | 12/2009 | Uchida | |
| 2011/0151295 | A1* | 6/2011 | Kim | H01M 2/263 |
| | | | | 429/94 |
| 2013/0316206 | A1* | 11/2013 | Jeong | H01M 10/052 |
| | | | | 429/94 |
| 2015/0325832 | A1 | 11/2015 | Saito et al. | |
| 2016/0268581 | A1* | 9/2016 | Ahn | H01M 2/263 |

OTHER PUBLICATIONS

Zeng, Office Action, U.S. Appl. No.15/457,775, dated Apr. 11, 2019, 11 pgs.
Ningde Amperex Technology Limited, Communication Pursuant to Article 94(3), EP17159512.7, Feb. 19, 2019, 6 pgs.
Zeng, Final Office Action, U.S. Appl. No. 15/457,775, dated Oct. 24, 2019, 12 pgs.

* cited by examiner

WOUND-TYPE CELL

CROSS REFERENCE TO RELATED APPLICATIONS

The present application is a continuation application of U.S. application Ser. No. 15/457,775, filed on Mar. 13, 2017, which claims priority to Chinese patent application No. 201610196793.8, filed on Mar. 31, 2016, both of which are incorporated herein by reference in their entirety.

FIELD OF THE PRESENT DISCLOSURE

The present disclosure relates to the field of battery, and particularly relates to a wound-type cell.

BACKGROUND OF THE PRESENT DISCLOSURE

With the commercial development of Lithium-ion cell, the requirement of market on energy density and mechanical abuse performance of the Lithium-ion cell is becoming higher and higher. Referring to FIG. 1, at a winding start end of a conventional wound-type cell, a blank positive current collector 111 (Al foil) is shorter than a blank negative current collector 211 (Cu foil) which is positioned at an inner side of the blank positive current collector 111, so the inside of the wound-type cell needs to redundantly wind a part of separator 3 which is positioned between the blank positive current collector 111 and the blank negative current collector 211 and is beyond the blank positive current collector 111 and the blank negative current collector 211, and this will lead to the waste of separator.

SUMMARY OF THE PRESENT DISCLOSURE

In view of the problem existing in the background, an object of the present disclosure is to provide a wound-type cell, which can reduce a usage amount of a separator and a thickness of the wound-type cell, and improve the energy density of the wound-type cell.

In order to achieve the above object, the present disclosure provides a wound-type cell which includes: a first electrode plate; a second electrode plate; a separator disposed between the first electrode plate and the second electrode plate; a first electrode tab electrically connected to the first electrode plate; and a second electrode tab electrically connected to the second electrode plate; in which a third winding start end of the separator is positioned at an outer side of a second winding start end of the second electrode plate in a length direction; the third winding start end extends along a direction away from a second end of the second winding start end and the third winding start end is not folded back.

Figure 1:
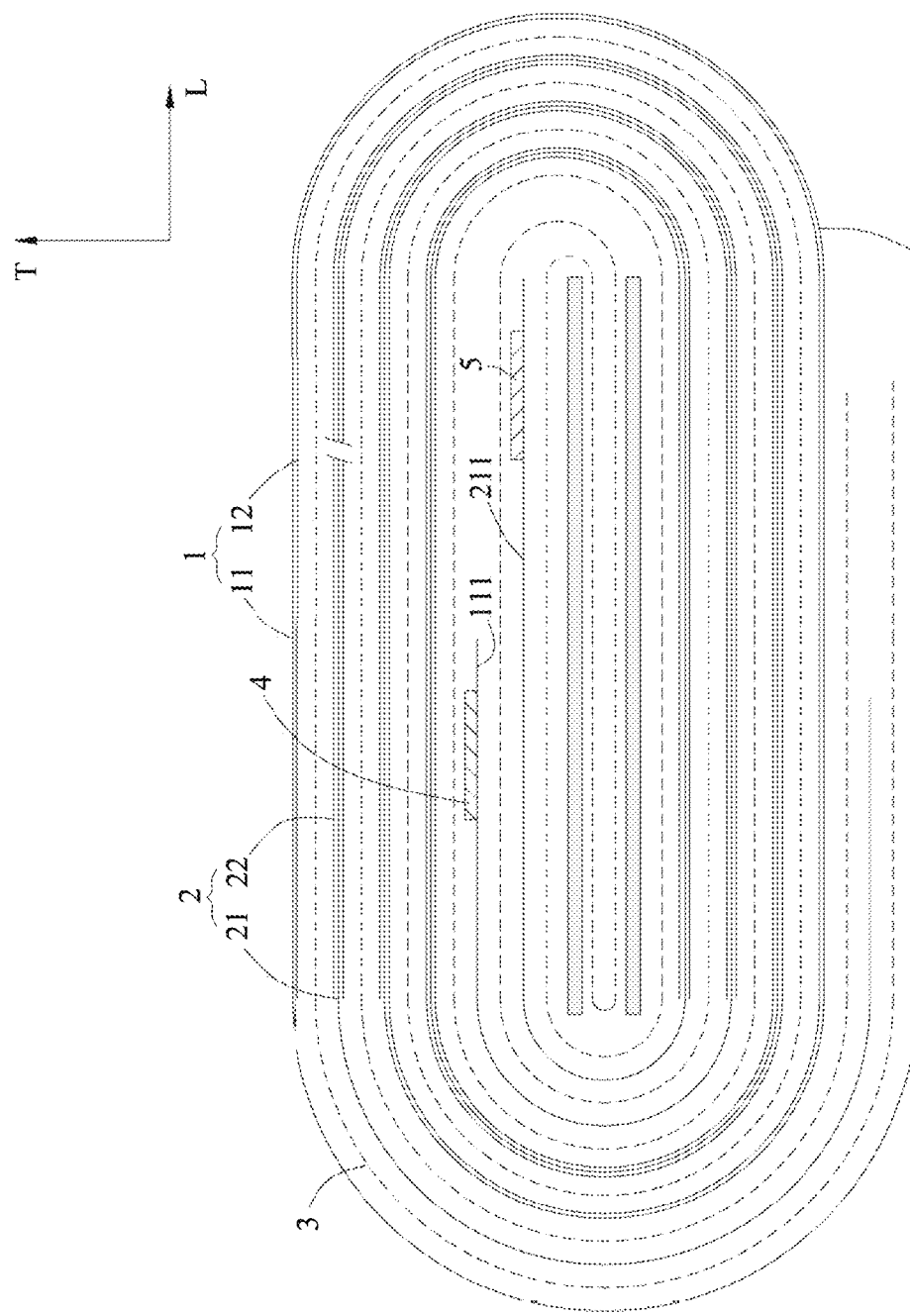
FIG. 1 is a schematic view of a wound-type cell and a winding mandrel of the prior art.

Reference numerals are represented as follows:
1 first electrode plate
  11 first current collector
    111 blank first current collector
  12 first active material layer
  13 first groove
2 second electrode plate
  21 second current collector
    211 blank second current collector
  22 second active material layer
  23 second groove
3 separator
4 first electrode tab
5 second electrode tab
E1 first winding start end
  E11 first end
E2 second winding start end
  E21 second end
E3 third winding start end
C arc-shaped portion
S1 first winding mandrel
  S11 first end surface
  S12 first side surface
S2 second winding mandrel
  S21 second end surface
  S22 second side surface
G clamping groove
L length direction
T thickness direction

DETAILED DESCRIPTION

Hereinafter a wound-type cell and a winding mandrel according to the present disclosure will be described in detail in combination with the figures.

Firstly, a wound-type cell according to a first aspect of the present disclosure will be described.

Referring to FIG. 2 through FIG. 11, a wound-type cell according to the present disclosure comprises: a first electrode plate 1 having a first current collector 11 and a first active material layer 12 coated on a surface of the first current collector 11; a second electrode plate 2 having a second current collector 21 and a second active material layer 22 coated on a surface of the second current collector 21, and a second winding start end E2 of the second electrode plate 2 is positioned at an inner side of a first winding start end E1 of the first electrode plate 1 in a thickness direction T; a separator 3 provided between the first electrode plate 1 and the second electrode plate 2 to separate the first electrode plate 1 from the second electrode plate 2; a first electrode tab 4 electrically connected to the first current collector 11; and a second electrode tab 5 electrically connected to the second current collector 21. A third winding start end E3 of the separator 3 is positioned at an outer side of the second winding start end E2 of the second electrode plate 2 in a length direction L, extends along a direction away from a second end E21 of the second winding start end E2 and is not folded back.

In the wound-type cell according to the present disclosure, because the third winding start end E3 of the separator 3 extends along the direction away from the second end E21 of the second winding start end E2 and is not folded back, there is no need to wind back the separator 3 in large length as in the prior art, thereby reducing a usage amount of the separator 3 and the cost of the separator 3. In addition, the way that the third winding start end E3 of the separator 3 extends can avoid the third winding start end E3 overlapping with the second winding start end E2 in the thickness direction T, thereby reducing a thickness of the wound-type cell and improve the energy density of the wound-type cell. At the same time, it is easy to realize automatic production of the wound-type cell of the present disclosure.

In an embodiment of a wound-type cell according to the present disclosure, a length of the third winding start end E3 of the separator 3 is between 1 mm and 10 mm, preferably, the length of the third winding start end E3 of the separator 3 is between 1 mm and 5 mm.

In an embodiment of the wound-type cell according to the present disclosure, referring to FIG. 2 through FIG. 7, a first half-circle of the second electrode plate 2 which is wound around the second winding start end E2 is a first layer of the second electrode plate 2, the first layer of the second electrode plate 2 and the second winding start end E2 face each other and a part of the separator 3 is provided between the first layer of the second electrode plate 2 and the second winding start end E2.

In an embodiment of the wound-type cell according to the present disclosure, referring to FIG. 2 through FIG. 7, the third winding start end E3 of the separator 3 is formed by two layers in the thickness direction T. The third winding start end E3 is a part of one layer and a part of the other layer which are clamped in a clamping groove G of a later mentioned winding mandrel; in the formed wound-type cell, the third winding start end E3 of the separator 3 is two layers, preferably, the two layers are attached together.

In an embodiment of the wound-type cell according to the present disclosure, the first electrode plate 1 may be a positive electrode plate or a negative electrode plate, correspondingly, the second electrode plate 2 may be a negative electrode plate or a positive electrode plate. Preferably, the first electrode plate 1 is a positive electrode plate and the second electrode plate 2 is a negative electrode plate, correspondingly, the first active material layer 12 is a positive active material layer, and specifically, the first active material layer 12 may be selected from at least one of lithium cobalt oxide ($LiCoO_2$), lithium ferric phosphate ($LiFePO_4$) and lithium manganese oxide ($LiMn_2O_4$). The second active material layer 22 is a negative active material layer, and specifically, the second active material layer 22 may be selected from at least one of carbon and silicon.

Figure 7:
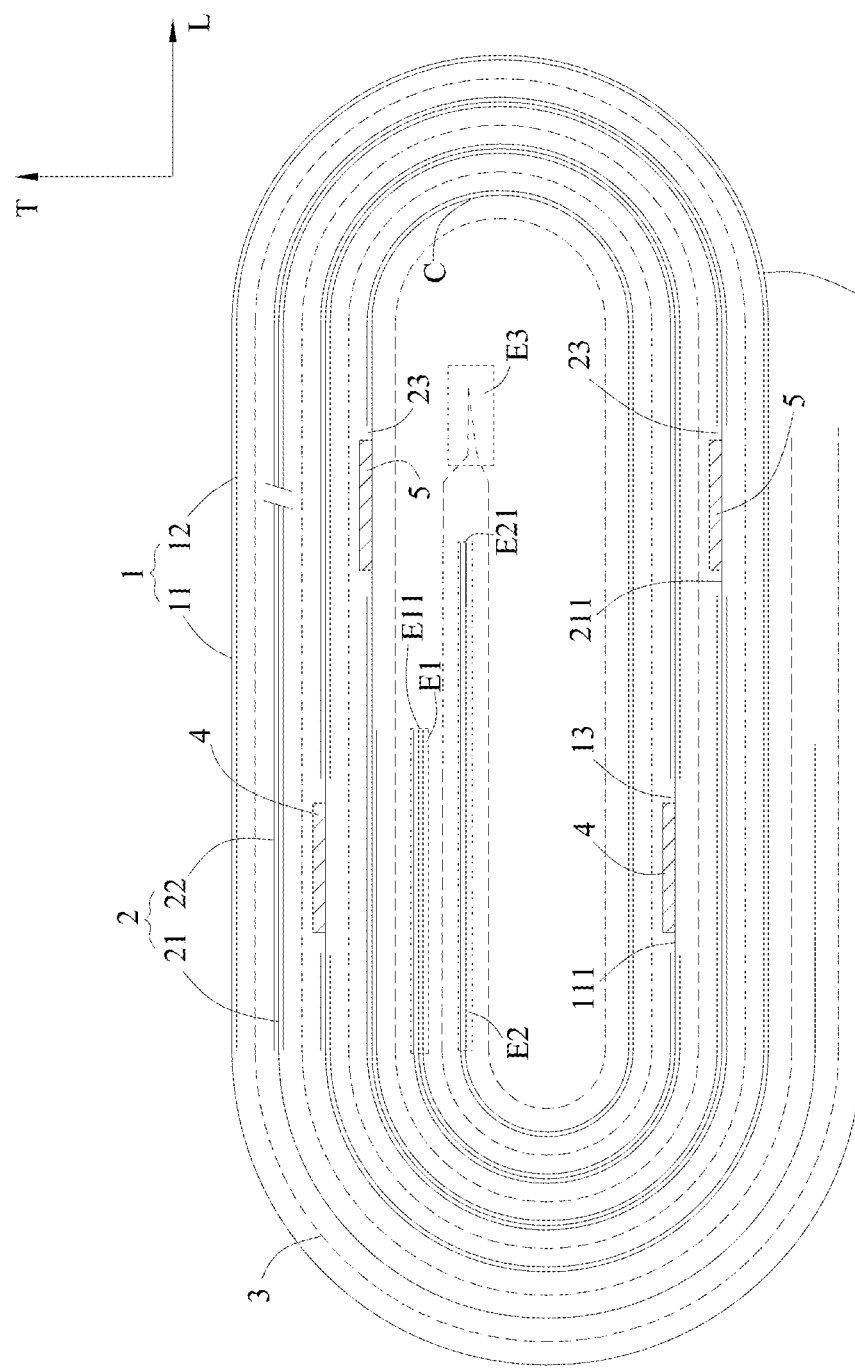
FIG. 7 is a schematic view of still another embodiment of the wound-type cell according to the present disclosure, in which a first winding start end, a second winding start end and a third winding start end each are indicated by a dotted line frame.
Figure 8:
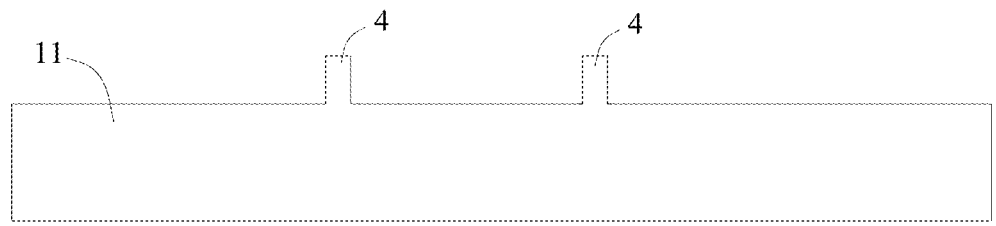
FIG. 8 is a schematic view of an embodiment of a first electrode tab formed in the wound-type cell according to the present disclosure, in which a first active material layer on a first current collector is omitted for the sake of clarity.
Figure 9:
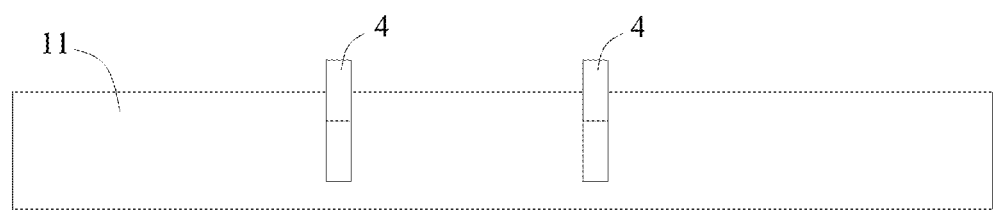
FIG. 9 is a schematic view of another embodiment of the first electrode tab formed in the wound-type cell according to the present disclosure, in which the first active material layer on the first current collector is omitted for the sake of clarity.

In an embodiment of the wound-type cell according to the present disclosure, the first electrode tab 4 is provided as one or more in number (referring to FIG. 7 through FIG. 9). When the first electrode tab 4 of the wound-type cell is provided as more than one in number, the first electrode tabs 4 are preferably aligned in the thickness direction T, however it allows each first electrode tab 4 to have a certain deviation in aligned position due to machining tolerance of each first electrode tab 4.

Figure 10:
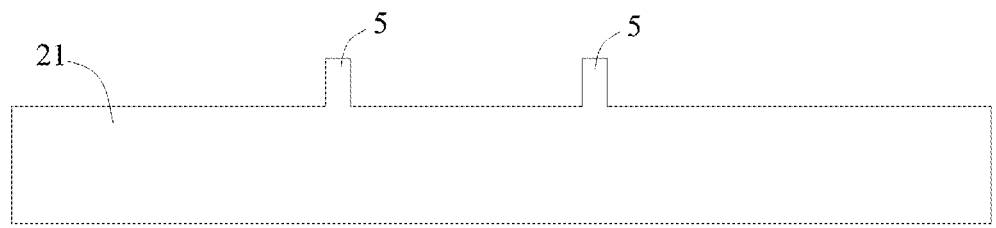
FIG. 10 is a schematic view of another embodiment of a second electrode tab formed in the wound-type cell according to the present disclosure, in which a second active material layer on a second current collector is omitted for the sake of clarity.
Figure 11:
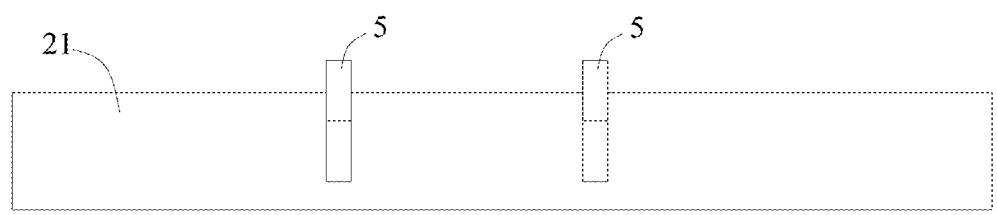
FIG. 11 is a schematic view of another embodiment of the second electrode tab formed in the wound-type cell according to the present disclosure, in which the second active material layer on the second current collector is omitted for the sake of clarity.

In an embodiment of the wound-type cell according to the present disclosure, the second electrode tab 5 is provided as one or more in number (referring to FIG. 7, FIG. 10 and FIG. 11). When the second electrode tab 5 of the wound-type cell is provided as more than one in number, the second electrode tabs 5 are preferably aligned in the thickness direction T, however it allows each second electrode tab 5 to have a certain deviation in aligned position due to machining tolerance of each second electrode tab 5.

In an embodiment of the wound-type cell according to the present disclosure, the first current collector 11 is an aluminum foil, the second current collector 21 is a copper foil.

In an embodiment of the wound-type cell according to the present disclosure, a thickness of the first electrode tab 4 is more than a thickness of the first current collector 11. This can ensure a connection strength and an overcurrent sectional area of the first electrode tab 4.

In an embodiment of the wound-type cell according to the present disclosure, a thickness of second electrode tab 5 is more than a thickness of the second current collector 21. This can ensure a connection strength and an overcurrent sectional area of the second electrode tab 5.

In an embodiment of the wound-type cell according to the present disclosure, referring to FIG. 2 through FIG. 6, the first electrode plate 1 has a blank first current collector 111 which is positioned at the first winding start end E1 and is not coated with the first active material layer 12; correspondingly, the second electrode plate 2 has a blank second current collector 211 which is positioned at the second winding start end E2 and is not coated with the second active material layer 22. When the second electrode tab 5 is connected to the blank second current collector 211, the way that the third winding start end E3 of the separator 3 extends can avoid superposition of a thickness of the third winding start end E3 and the thickness of the second electrode tab 5 in the thickness direction T, thereby reducing the thickness of the wound-type cell and improve the energy density of the wound-type cell.

In an embodiment of the wound-type cell according to the present disclosure, referring to FIG. 2 through FIG. 6, a side of the second current collector 21 which directly faces the blank first current collector 111 is not coated with the second active material layer 22. Because the blank first current collector 111 is not coated with the first active material layer 12, if the side of the second current collector 21 which directly faces the blank first current collector 111 is coated with the second active material layer 22, it is not only helpless to the capacity (lithium-ions cannot realize the reciprocating process of intercalation and deintercalation between the blank first current collector 111 and the second current collector 21 that directly faces the blank first current collector 111) but also increases the thickness of the wound-type cell and reduces the energy density of the wound-type cell. Therefore, the side of the second current collector 21 which directly faces the blank first current collector 111 may be not coated with the second active material layer 22, and this will avoid waste in material and improve the energy density of the wound-type cell.

In an embodiment of the wound-type cell according to the present disclosure, referring to FIG. 2 through FIG. 6, a side of the first current collector 11 which directly faces the blank second current collector 211 is not coated with the first active material layer 12. Because the blank second current collector 211 is not coated with the second active material layer 22, if the side of the first current collector 11 which directly faces the blank second current collector 211 is coated with the first active material layer 12, it is not only helpless to the capacity (lithium-ion cannot realize the reciprocating process of intercalation and deintercalation between the blank second current collector 211 and the first current collector 11 which directly faces the blank second current collector 211) but also increases the thickness of the wound-type cell and reduces the energy density of the wound-type cell. Therefore, the side of the first current collector 11 which directly faces the blank second current collector 211 may be not coated with the first active material layer 12, and this will avoid waste in material and improve the energy density of the wound-type cell.

In an embodiment of the wound-type cell according to the present disclosure, referring to FIG. 2 through FIG. 6, an inner side of an arc-shaped portion C of the second current collector 21 which directly faces a first end E11 of the first winding start end E1 is not coated with the second active material layer 22. Because the first end E11 of the first winding start end E1, which directly faces the inner side of the arc-shaped portion C of the second current collector 21, is not coated with the first active material layer 12, if the inner side of the arc-shaped portion C is coated with the second active material layer 22, it is not only helpless to the capacity (lithium-ion cannot realize the reciprocating process of intercalation and deintercalation between the inner side of the arc-shaped portion C of the second current collector 21 and the first end E11 of the first winding start end E1) but also increases the thickness of the wound-type cell and reduces the energy density of the wound-type cell. Therefore, the inner side of the arc-shaped portion C may be not coated with the second active material layer 22, and this will avoid waste in material and improve the energy density of the wound-type cell.

Figure 2:
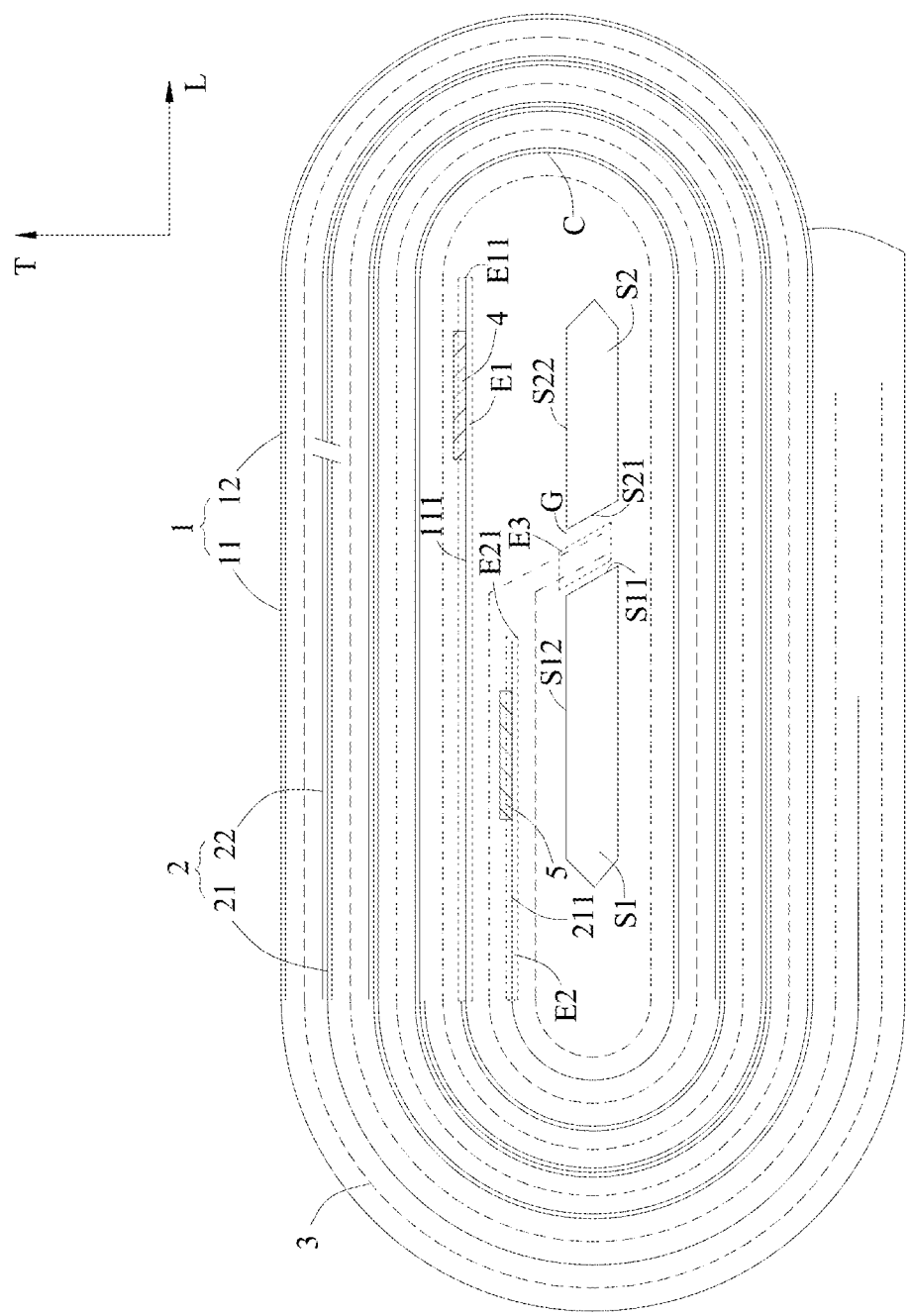
FIG. 2 is a schematic view of an embodiment of a wound-type cell and a winding mandrel according to the present disclosure, in which a first winding start end, a second winding start end and a third winding start end each are indicated by a dotted line frame.
Figure 3:
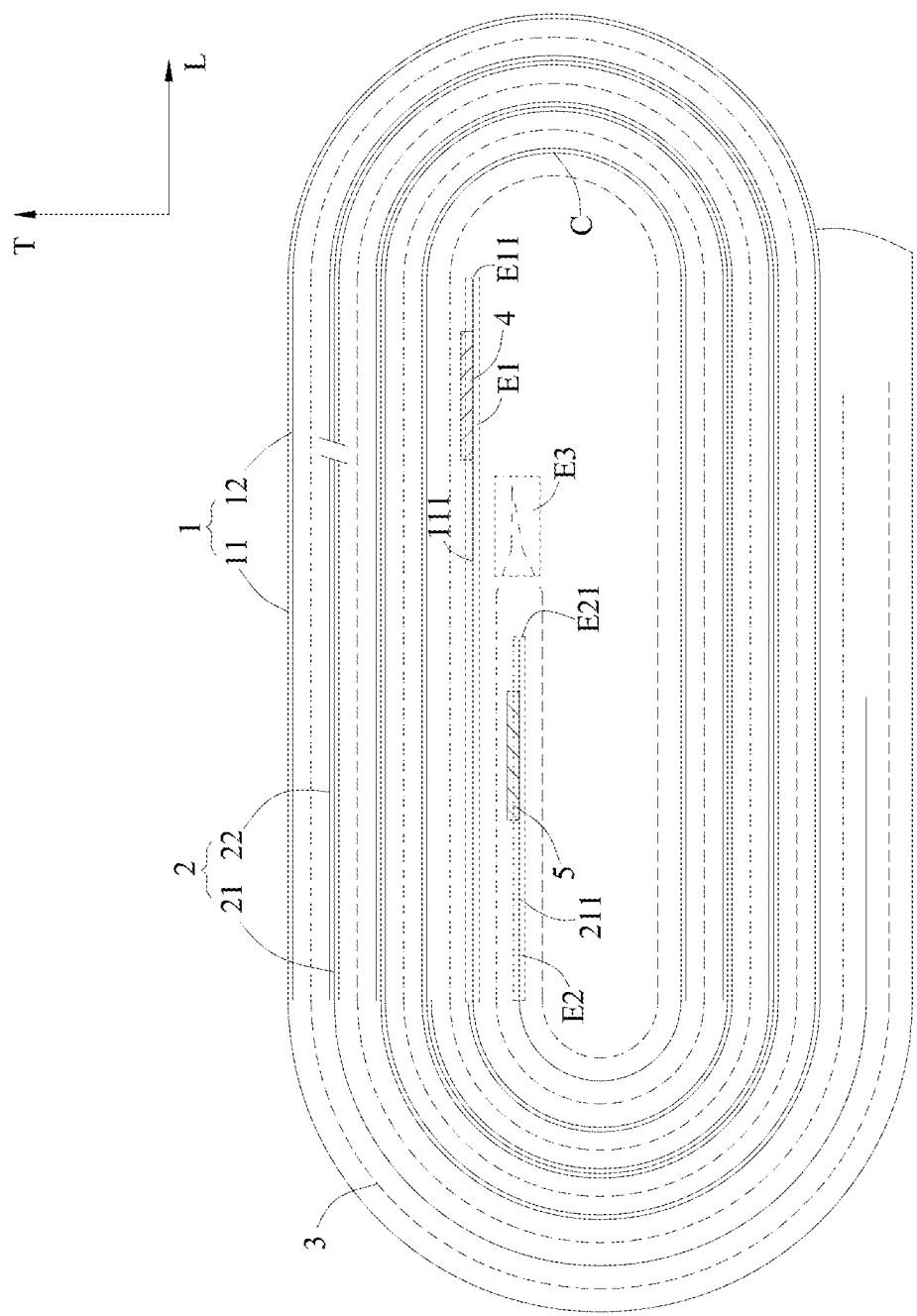
FIG. 3 is a schematic view of an embodiment of the wound-type cell of FIG. 2.
Figure 4:
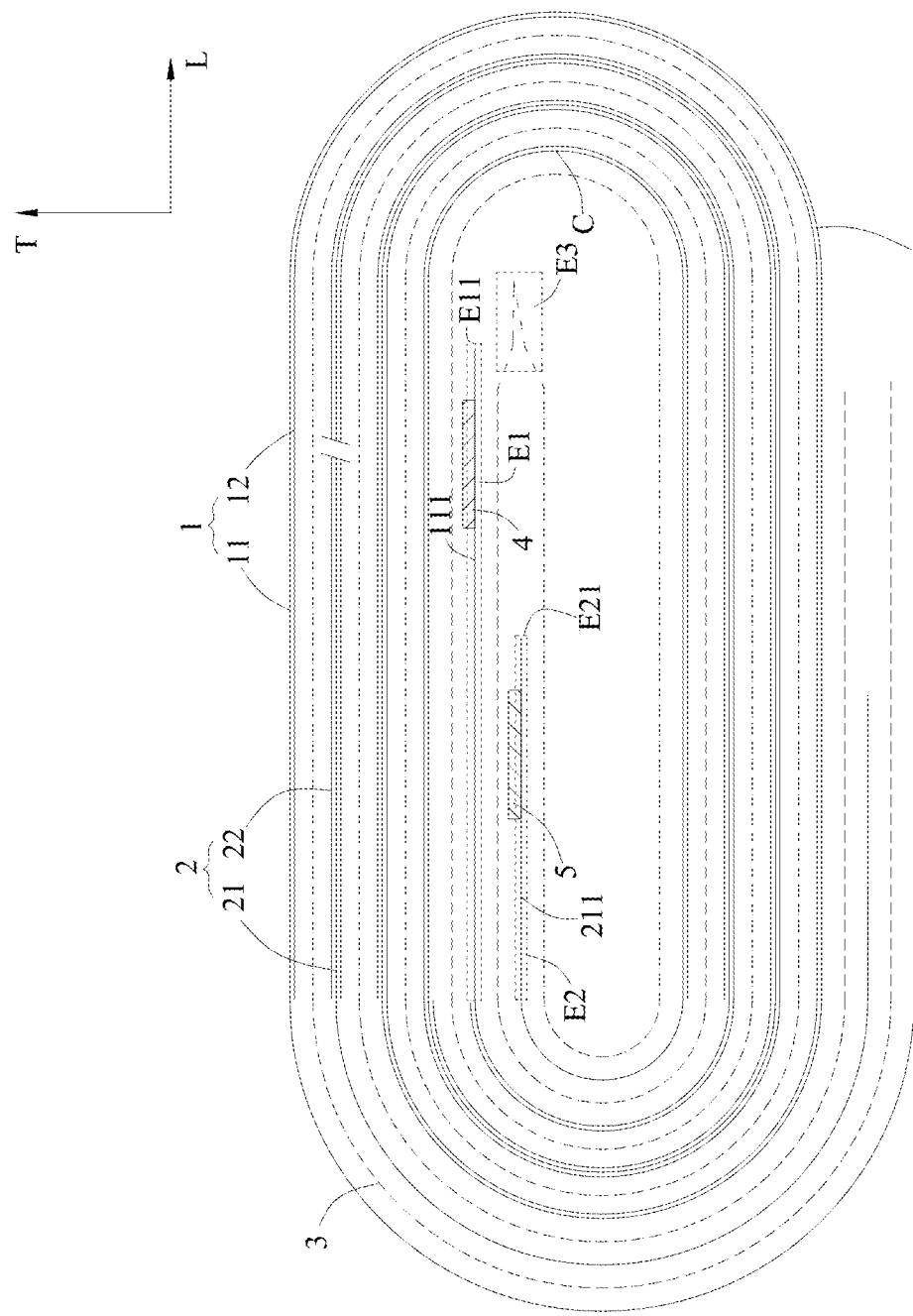
FIG. 4 is a schematic view of another embodiment of the wound-type cell of FIG. 2.

In an embodiment of the wound-type cell according to the present disclosure, referring to FIG. 2 through FIG. 4, the first end E11 of the first winding start end E1 is beyond the second end E21 of the second winding start end E2 in the length direction L and a position of the first electrode tab 4 is beyond the second end E21 of the second winding start end E2 in the length direction L. This winding way can further reduce the usage amount of the separator 3 and in turn reduce the cost.

Figure 5:
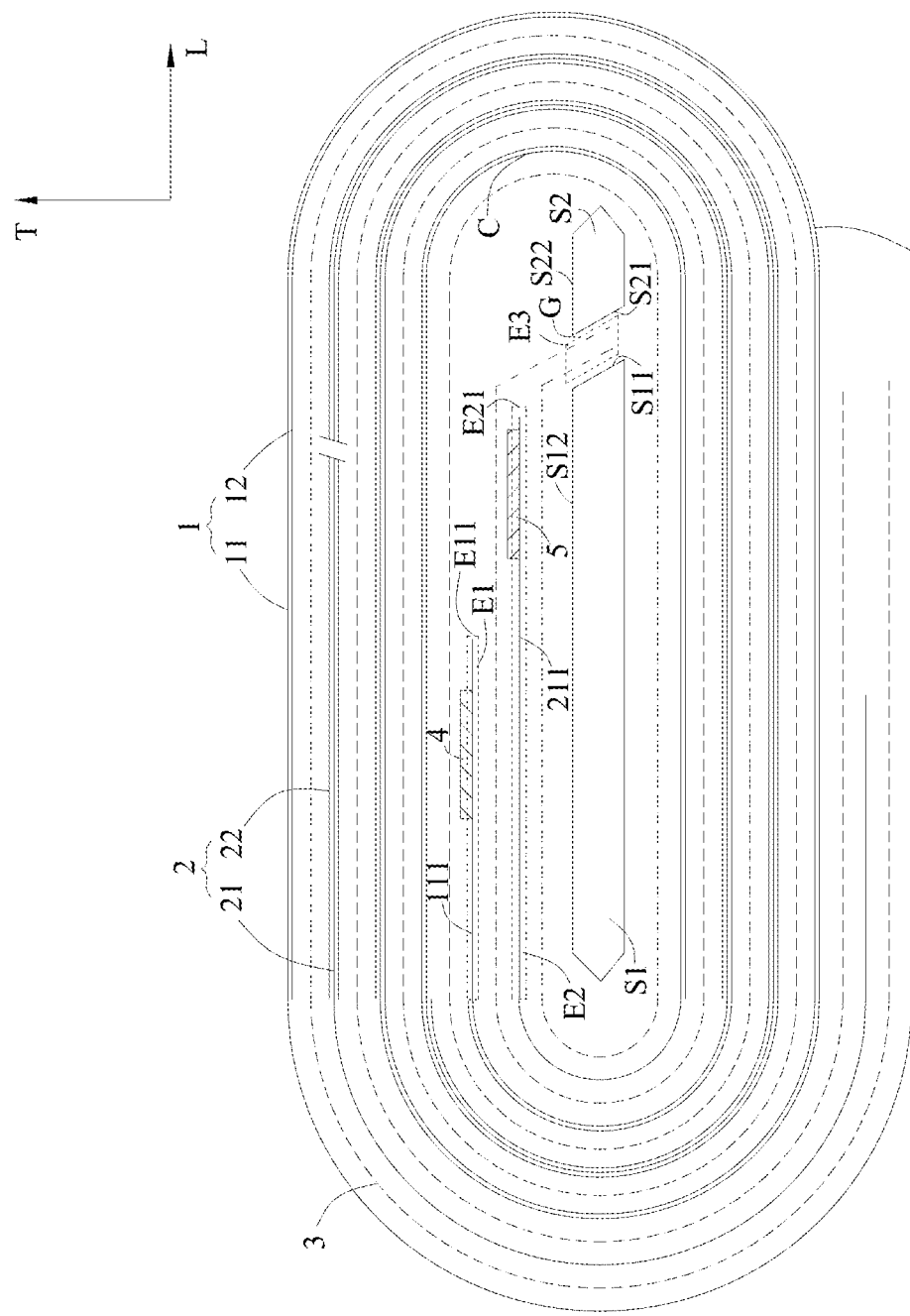
FIG. 5 is a schematic view of another embodiment of the wound-type cell and the winding mandrel according to the present disclosure, in which a first winding start end, a second winding start end and a third winding start end each are indicated by a dotted line frame.
Figure 6:
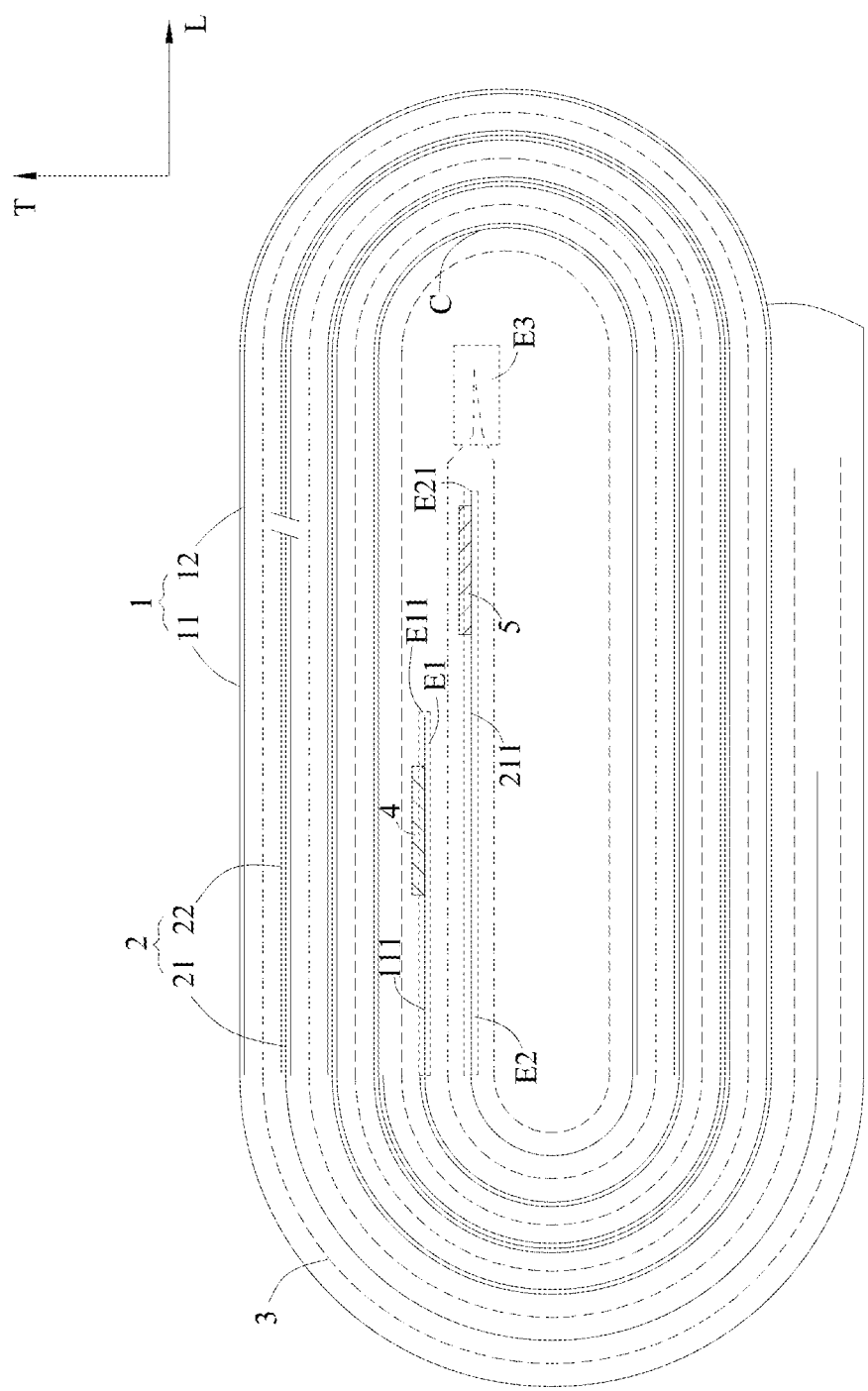
FIG. 6 is a schematic view of the wound-type cell of FIG. 5.

In an embodiment of the wound-type cell according to the present disclosure, referring to FIG. 5 and FIG. 6, the second end E21 of the second winding start end E2 is beyond the first end E11 of the first winding start end E1 in the length direction L and a position of the second electrode tab 5 is beyond the first end E11 of the first winding start end E1 in the length direction L.

In an embodiment of the wound-type cell according to the present disclosure, referring to FIG. 7, the first electrode plate 1 further has a first groove 13, a bottom of the first groove 13 is a blank first current collector 111 which is exposed and a peripheral side of the first groove 13 is the first active material layer 12; correspondingly, the second electrode plate 2 further has a second groove 23, a bottom of the second groove 23 is a blank second current collector 211 and a peripheral side of the second groove 23 is the second active material layer 22.

In an embodiment of the wound-type cell according to the present disclosure, the first electrode tab 4 and the first current collector 11 are integrally formed. For example, referring to FIG. 8, the first electrode tab 4 is formed by directly cutting the first current collector 11. More preferably, as shown in FIG. 9, the first electrode tab 4 is formed by directly cutting a portion of the first current collector 11 and bending the cut portion.

In an embodiment of the wound-type cell according to the present disclosure, the second electrode tab 5 and the second current collector 21 are integrally formed. For example, referring to FIG. 10, the second electrode tab 5 is formed by directly cutting the second current collector 21. More preferably, as shown in FIG. 11, the second electrode tab 5 is formed by directly cutting a portion of the second current collector 21 and bending the cut portion.

In an embodiment of the wound-type cell according to the present disclosure, the first electrode tab 4 is formed separately and welded to the corresponding blank first current collector 111.

In an embodiment of the wound-type cell according to the present disclosure, the second electrode tab 5 is formed separately and welded to the corresponding blank second current collector 211.

In an embodiment of the wound-type cell according to the present disclosure, the welding is laser welding, ultrasonic welding or resistance welding.

The forming mode of the first electrode tab 4 preferably uses the integrally forming mode. The forming mode of the second electrode tab 5 preferably uses the integrally forming mode.

Secondly, a winding mandrel according to a second aspect of the present disclosure will be described.

Referring to FIG. 2 through FIG. 5, a winding mandrel according to a second aspect of the present disclosure is used for the wound-type cell according to the first aspect of the present disclosure, the winding mandrel comprises a first winding mandrel S1 and a second winding mandrel S2 which are sequentially provided along the length direction L, a first end surface S11 of the first winding mandrel S1 and a second end surface S21 of the second winding mandrel S2 face each other and form a clamping groove G; an end of the first end surface S11 which is away from the second winding start end E2 is beyond an end of the first end surface S11 which is close to the second winding start end E2 in the length direction L; correspondingly, an end of the second end surface S21 which is away from the second winding start end E2 is beyond an end of the second end surface S21 which is close to the second winding start end E2 in the length direction L.

In an embodiment of the wound-type cell according to the present disclosure, referring to FIG. 2 through FIG. 5, the first end surface S11 and the second end surface S21 are parallel to each other.

In an embodiment of the wound-type cell according to the present disclosure, referring to FIG. 2 through FIG. 5, an angle between the first end surface S11 and a first side surface S12 of the first winding mandrel S1 which is close to the blank second current collector 211 is between 160 degrees and 110 degrees; correspondingly, an angle between the second end surface S21 and a second side surface S22 of the second winding mandrel S2 which is close to the blank second current collector 211 is between 20 degrees and 70 degrees.

What is claimed is:

1. A wound-type cell, comprising:
a first electrode plate;
a second electrode plate;
a separator disposed between the first electrode plate and the second electrode plate;
a first electrode tab electrically connected to the first electrode plate; and
a second electrode tab electrically connected to the second electrode plate;
wherein
the first electrode tab and the second electrode tab are positioned on a same side relative to a middle portion of the wound-type cell in a thickness direction of the wound-type cell, the first electrode tab is electrically connected to one surface of the first electrode plate facing away from a center of the wound-type cell in the thickness direction of the wound-type cell, and the second electrode tab is electrically connected to one surface of the second electrode plate facing away from the center of the wound-type cell in the thickness direction of the wound-type cell;
a third winding start end of the separator is positioned at an outer side of a second winding start end of the second electrode plate in a length direction of the wound-type cell; and
the third winding start end extends along a direction away from a second end of the second winding start end and the third winding start end is not folded back and has a tilted obtuse angle between 110 degrees and 160 degrees relative to an inner end of the second electrode plate near the center of the wound-type cell.

2. The wound-type cell according to claim 1,
the first electrode plate comprising a first current collector and a first active material layer coated on a surface of the first current collector;
the second electrode plate comprising a second current collector and a second active material layer coated on a surface of the second current collector;
the first electrode tab electrically connected to the first current collector; and
the second electrode tab electrically connected to the second current collector;
wherein the second winding start end of the second electrode plate is disposed at an inner side of a first winding start end of the first electrode plate in the thickness direction of the wound-type cell.

3. The wound-type cell according to claim 2, wherein
the first electrode plate comprises a blank first current collector positioned at the first winding start end, the blank first current collector is not coated with the first active material layer;
the second electrode plate comprises a blank second current collector positioned at the second winding start end, the blank second current collector is not coated with the second active material layer,
wherein the blank first current collector of the first electrode plate and the blank second current collector of the second electrode plate are each in physical contact with a respective one of two opposites sides of the separator in the thickness direction of the wound-type cell.

4. The wound-type cell according to claim 3, wherein
a side of the second current collector, directly facing the blank first current collector, is not coated with the second active material layer;
a side of the first current collector, directly facing the blank second current collector, is not coated with the first active material layer.

5. The wound-type cell according to claim 3, wherein the first electrode tab and the first current collector are integrally formed;
the second electrode tab and the second current collector are integrally formed.

6. The wound-type cell according to claim 2, wherein an inner side of an arc-shaped portion of the second current collector, directly facing a first end of the first winding start end, is not coated with the second active material layer.

7. The wound-type cell according to claim 6, wherein
the first end is beyond the second end in the length direction and the first electrode tab is beyond the second end in the length direction; or
the second end is beyond the first end in the length direction and the second electrode tab is beyond the first end in the length direction.

8. The wound-type cell according to claim 2, wherein
the first electrode plate further comprises a first groove configured to receive the first electrode tab, the first electrode tab is electrically connected with the first current collector through the first groove;
the second electrode plate further comprising a second groove configured to receive the second electrode tab, the second electrode tab is electrically connected with the second current collector through the second groove.

9. The wound-type cell according to claim 8, wherein
the first electrode tab is formed separately and welded to the corresponding blank first current collector;
the second electrode tab is formed separately and welded to the corresponding blank second current collector.

10. The wound-type cell according to claim 1, wherein a length of the third winding start end is 1 mm to 5 mm.

11. The wound-type cell according to claim 1, wherein the first electrode plate is a positive electrode plate, the second electrode plate is a negative electrode plate.

12. The wound-type cell according to claim 1, wherein the wound-type cell comprises a plurality of the first electrode tabs, the wound-type cell comprises a plurality of the second electrode tabs.

* * * * *